United States Patent
Tsutsumi et al.

(10) Patent No.: US 7,799,464 B2
(45) Date of Patent: Sep. 21, 2010

(54) HYBRID BATTERY

(75) Inventors: Kazuo Tsutsumi, Hyogo (JP); Kazuya Nishimura, Hyogo (JP); Susumu Mitsuda, Hyogo (JP)

(73) Assignees: Kawasaki Jukogyo Kabushiki Kaisha, Kobe (JP); Osaka Gas Co., Ltd., Osaka (JP)

( * ) Notice: Subject to any disclaimer, the term of this patent is extended or adjusted under 35 U.S.C. 154(b) by 1300 days.

(21) Appl. No.: 10/489,260

(22) PCT Filed: Sep. 13, 2002

(86) PCT No.: PCT/JP02/09410

§ 371 (c)(1),
(2), (4) Date: Mar. 11, 2004

(87) PCT Pub. No.: WO03/026054

PCT Pub. Date: Mar. 27, 2003

(65) Prior Publication Data

US 2004/0248003 A1    Dec. 9, 2004

(30) Foreign Application Priority Data

Sep. 19, 2001  (JP) ............................. 2001-284492

(51) Int. Cl.
*H01M 4/66* (2006.01)
*H01M 4/02* (2006.01)
*H01M 4/62* (2006.01)

(52) U.S. Cl. ................... 429/245; 429/209; 429/232

(58) Field of Classification Search ........... 429/120–160
See application file for complete search history.

(56) References Cited

U.S. PATENT DOCUMENTS

| 3,260,576 | A | * | 7/1966 | Winsel et al. ............... 428/566 |
| 4,029,860 | A | * | 6/1977 | Vissers et al. ............... 429/122 |
| 4,048,397 | A | * | 9/1977 | Rothbauer ................... 429/131 |
| 4,547,443 | A | * | 10/1985 | Rowlette et al. ............ 429/217 |
| 6,576,366 | B1 | * | 6/2003 | Fujiwara et al. .......... 429/218.1 |
| 6,689,507 | B1 | * | 2/2004 | Tsutsumi et al. ............... 429/67 |
| 2004/0164712 | A1 | * | 8/2004 | Lin et al. ..................... 320/136 |

FOREIGN PATENT DOCUMENTS

EP    0 814 530 A1    12/1997

(Continued)

OTHER PUBLICATIONS

Russian Journal of Applied Chemistry, vol. 76, No. 6, 2003, pp. 923.*

(Continued)

*Primary Examiner*—Dah-Wei D Yuan
*Assistant Examiner*—Edu E Enin-Okut
(74) *Attorney, Agent, or Firm*—Marshall, Gerstein & Borun LLP (57) ABSTRACT

At least two types of active materials having different charge and discharge characteristics are combined and incorporated into a same cell to provide a battery. The active materials having different charge and discharge characteristics to be incorporated have any form without limitation to a particulate shape, a plate, a rod or the like. The active materials having different charge and discharge characteristics are incorporated into either or both of the cathode and the anode.

7 Claims, 4 Drawing Sheets

FOREIGN PATENT DOCUMENTS

| | | |
|---|---|---|
| EP | 0 750 359 B1 | 12/1999 |
| EP | 1 174 939 A1 | 1/2002 |
| JP | 04-075256 | 3/1992 |
| JP | 05013107 A * | 1/1993 |
| JP | 09-161796 | 6/1997 |
| JP | 10-340720 | 12/1998 |
| JP | 11-003705 | 1/1999 |
| JP | 2000-090921 | 3/2000 |
| JP | 2000277183 A * | 10/2000 |
| JP | 2001-176553 | 6/2001 |
| JP | 2001-236956 | 8/2001 |
| WO | WO 0059062 A1 * | 10/2000 |

OTHER PUBLICATIONS

International Search Report, from the Japanese Patent Office for International Application No. PCT/JP02/09410 dated Dec. 24, 2002.

* cited by examiner

HYBRID BATTERY

TECHNICAL FIELD

The present invention relates to a hybrid battery constructed by combining an active material that is chargeable and dischargeable at a high discharge rate and an active material that is chargeable and dischargeable at a low discharge rate into a single battery.

BACKGROUND ART

Japanese Patent Publication No. 3051401 discloses the so-called three-dimensional battery using active materials formed into powders or particles. International Publication No. WO 00/59062 discloses a stacked three-dimensional battery. Further, three-dimensional batteries having a fixed layer formed by filling a particulate active material are disclosed in Japanese Patent Laid-Open Publications Nos. 2002-141101 and 2002-141104.

Since a conventional secondary battery employs active materials having the same charge and discharge characteristics, it has been generally conducted to make one battery which is chargeable and dischargeable at a large current but has a low capacity (power-ensuring battery) and another battery which is chargeable and dischargeable not at a large current but at a small current and has a high capacity (energy-ensuring battery) separately. Since the charging and discharging at a large current is incompatible with a high capacity, there exists no battery which is chargeable and dischargeable at a large current, and has a high capacity.

The following two methods can be conceived when it is required for battery system to be chargeable and dischargeable at a large current, and to have a high capacity.

(1) Connecting plural power-ensuring batteries, which are chargeable and dischargeable at a large current but has a low capacity, until a required capacity is ensured. The power of this battery assembly is too large and hence is uneconomical.

(2) Connecting plural energy-ensuring batteries, which are chargeable and dischargeable at a small current and has a high capacity, until a required power is ensured. The energy of this battery assembly is too large and hence is uneconomical.

An electrical appliance having no any rotating part, such as an electric heater, substantially requires a constant value of current throughout a starting operation and a steady operation, whereas an electrical appliance having a rotating part, such as a motor, requires instantaneously in the starting operation a value of current of about three times as high as the steady operation. When the electrical appliance having a rotating part, such as a motor, is driven by a battery, selection of a battery according to the specifications of the appliance for a steady operation will shorten the life of the battery because the battery cannot withstand instantaneous discharge of a large current in the starting operation due to the aforementioned characteristics.

An electric car, electric motorcycle or the like, in particular, requires a large current instantaneously for acceleration. Such an electric vehicle also requires a large amount of energy in order to prolong its traveling distance. For this reason, the performance of the electric car or the electric motorcycle is dependent on the performance of a battery used.

A cell starter or the like requires a large current instantaneously, which means that a large current is necessary for an instant (within a few seconds), as can be read literally. Such a cell starter, therefore does not require a large current for several ten minutes. A lead accumulator has such a characteristics. It is capable of instantaneously outputting high power, but can effectively utilize only about 10% of its whole storage energy.

The present invention, which has been devised in view of the aforementioned points, intends to attain an object to provide a hybrid battery which is capable of instantaneously outputting high power in a starting operation or the like while having an increased energy capacity by combining active materials having different charge and discharge characteristics, i.e. an power-ensuring active material and an energy-ensuring active material, into a single battery.

DISCLOSURE OF INVENTION

In order to accomplish the aforementioned object, the present invention provides a hybrid battery comprising two cells connected with a separator interposed therebetween, a forming product of a cathode active material being placed in an electrolyte in one of the cells, a forming product of an anode active material being placed in an electrolyte in the other cell, the cell loaded with the cathode active material being provided with a cathode current collector keeping contact with the cathode active material, and the cell loaded with the anode active material being provided with an anode current collector keeping contact with the anode active material, wherein at least one of the cathode active material and the anode active material comprises a combination of at least two types of active material forming products having different charge and discharge characteristics, the combination being loaded into a single cell.

The present invention also provides a hybrid battery comprising a cathode current collector and an anode current collector oppositely disposed, a bellows-shaped separator being disposed between the two current collectors in a manner to be brought close to the two current collectors alternately, a forming product of a cathode active material being placed together with an electrolyte in spaces defined by the bellows-shaped separator and the cathode current collector; and a forming product of an anode active material being placed together with an electrolyte in spaces defined by the bellows-shaped separator and the anode current collector, the cathode active material and the anode active material being incorporated as alternating with each other by the separator interposed therebetween, wherein at least one of the cathode active material and the anode active material comprises a combination of at least two types of active material forming products having different charge and discharge characteristics.

In the above-described composition, it is possible to use an power-ensuring active material for providing a battery which is chargeable and dischargeable at a large current but has a low storage capacity and an energy-ensuring active material for providing a battery which is chargeable and dischargeable not at a large current but at a small current and has a high storage capacity as the active material forming products having different charge and discharge characteristics, respectively.

In the above-described composition, each of the active material forming products having different charge and discharge characteristics may be any shape without any limitation, for example, a particle, a plate, a block, a rod or a shape resulting from postforming of particles.

In the above-described composition, preferably, each of the active material forming products has surfaces, any part of which is coated with an ion-permeable current collector. The ion-permeable current collector has voids therein for allowing ions to pass therethrough, and is electrically conductive. Usable as the ion-permeable current collector are metals such as foamed nickel metal, reticulated nickel metal, nickel-plated punched metal, and nickel-plated expanded metal, foamed resin such as nickel-plated urethane, porous materials such as nickel-plated polyethylene, nickel-plated polypropylene, nickel-plated nylon, nickel-plated cotton, nickel-plated carbon fiber and the like, nickel-plated inorganic fibers of silica, alumina and the like, nickel-plated organic fibers, nickel-plated felts, and nickel-plated inorganic foils of mica and the like.

The separator can be electrically insulated without any change of properties such as corrosion in an alkaline electrolyte and allows ions to pass therethrough. Examples of usable separators comprise a woven or nonwoven fabric which are formed from polytetrafluoroethylene, polyethylene, polypropylene, and nylon or the like, or a membrane filter.

Each of the cathode current collector and the anode current collector is not subject to any change of properties such as corrosion in an alkaline electrolyte and is ion-impermeable and electrically conductive. Examples of usable current collectors comprise a nickel metal plate, nickel metal foil, carbon, nickel-plated iron or stainless steel, and nickel-plated carbon.

Each of the active material forming products may be a product produced by adding an electrically conductive filler and a resin to material causing a cell reaction and then curing the resultant mixture.

All active materials can be used as the material of each active material regardless of the type of the battery in which they are to be used and regardless of whether the cathode or the anode in which they are to be used. For example, it is possible to use nickel hydroxide which is used as a cathode active material in nickel-hydrogen secondary batteries, and a hydrogen-occluding alloy which is used as an anode active material in the above batteries, and the like. Usable as the electrically conductive filler are carbon fiber, nickel-plated carbon fiber, carbon particles, nickel-plated carbon particles, nickel-plated organic fiber, nickel-plated inorganic fiber of silica, alumina or the like, and nickel-plated foil of an inorganic substance such as mica, fibrous nickel, nickel particles, and nickel foil. These materials may be used either alone or in combination.

Usable as the resin to be added to each active material are a thermoplastic resin having a softening point not higher than 120° C., a resin having a curing temperature ranging from room temperature to 120° C., a resin which is soluble in a solvent having an evaporating temperature not higher than 120° C., and a resin which is soluble in a solvent that is soluble in water or alcohol. For example, where nickel hydroxide is used as the active material, various processing needs to be performed at temperatures lower than 130° C. because nickel hydroxide loses its activity at 130° C. or higher. Further, the resin to be added to the active material needs to have alkali resistance, since the active material is used in the alkaline electrolyte.

Thermoplastic resins usable as the thermoplastic resin having a softening point not higher than 120° C. include polyethylene, polypropylene, ethylene-vinyl acetate copolymer (EVA), and the like. Resins usable as the resin having a curing temperature ranging from room temperature to 120° C. comprise reactive curing resins (epoxy resin, urethane resin, unsaturated polyester resin and the like), thermosetting resins (phenolic resin and the like), and the like. The above-mentioned thermoplastic resins are usable as the resin which is soluble in a solvent having an evaporating temperature not higher than 120° C. The resin which is soluble in a solvent is used by a method comprising the steps of dissolving the resin in the solvent, adding the resultant solution to the active material, and removing the solvent by evaporation or extraction. Resins usable as the resin which is soluble in a solvent that is soluble in water and extractable comprise polyether sulfone (PES) resin, polystyrene, polysulfone, polyacrylonitrile, polyvinylidene fluoride, polyamide, polyimide, and the like. Resins usable as the resin which is soluble in a solvent that is soluble in alcohol and extractable comprise cellulose acetate, oxide phenylene ether (PPO), and the like.

Each active material to be used can have a charge and discharge characteristics selected as desired by adjusting the mixing ratio between the material causing cell reaction, the electrically conductive filler and the resin, the size and/or the density of each forming product, or the like. For example, the power-ensuring active material is made to comprise a relatively small amount of the material causing cell reaction, a relatively large amount of the electrically conductive filler, and a relatively small amount of the resin and have a relatively small primary particle size and a relatively low postformed density. On the other hand, the energy-ensuring active material is made to comprise a relatively large amount of the material causing cell reaction, a relatively small amount of the electrically conductive filler, and a relatively large amount of the resin and have a relatively large primary particle size and a relatively high postformed density.

The present invention thus composed has the following advantages.

(1) By combining the active materials having different charge and discharge characteristics, namely the power-ensuring active material and the energy-ensuring active material, into a single battery, it is possible to realize a battery which is capable of instantaneously outputting high power in a starting operation or the like while having a large energy capacity. Assuming that the total amount of the active materials used in a battery is 100, it enables the battery to be able to instantaneously output high power and to have enough energy that amounts of the power-ensuring and energy-ensuring active materials are 50 and 50, respectively.

(2) Since the charge and discharge characteristics and the amount of each of the active materials to be used can be selected according to any requirement, the performance of the battery can be adjusted in accordance with applications of the battery.

(3) Though the discharge of the power-ensuring active material terminates immediately after instantaneous outputting of power, the energy-ensuring active material has discharged little, hence, still has enough energy. Accordingly, the power-ensuring active material can be charged from the energy-ensuring active material. For this reason, the battery can repeat instantaneous outputting high power at specified time intervals.

BEST MODE FOR CARRYING OUT THE INVENTION

Hereinafter, the present invention will be described by way of its embodiments, which, in no way, limit the present invention and which can be conducted by being modified appropriately.

Figure 1:
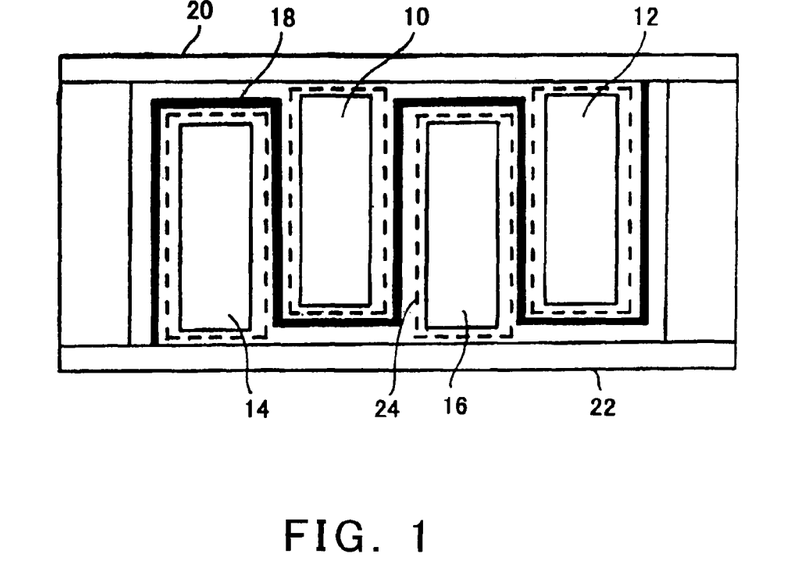
FIG. 1 is a schematic view illustrating an example of a hybrid battery (having a bellows-shaped unit) according to a first embodiment of the present invention.
Figure 2:
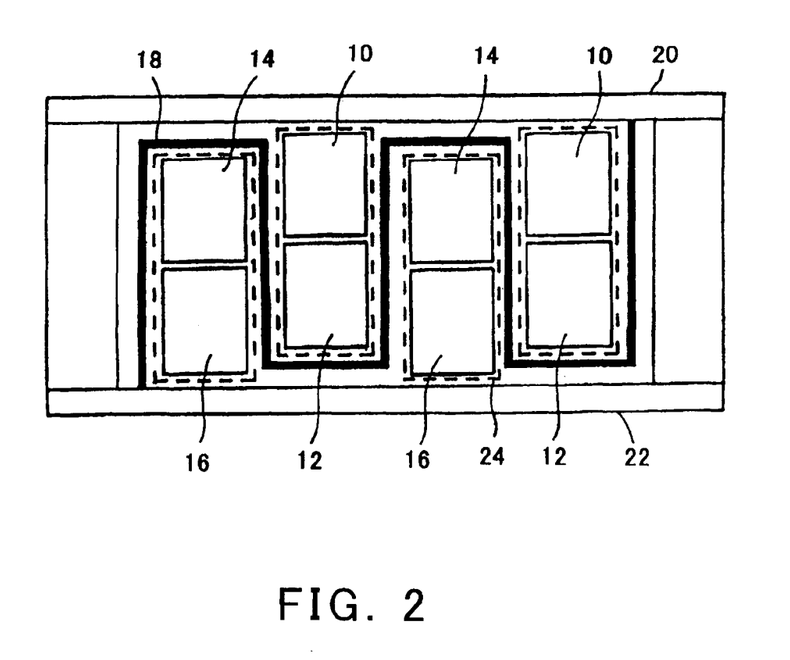
FIG. 2 is a schematic view illustrating another example of the hybrid battery (having a bellows-shaped unit) according to the first embodiment of the present invention.

FIGS. 1 and 2 illustrate hybrid batteries according to the first embodiment of the present invention. A resin and an electrically conductive filler are added to active material causing a cell reaction and the resultant mixture is cured to form an active material forming product in the shape of particle, plate, block, rod or the like. In this case, it is possible to use a postformed product of particulate active material. All active materials can be used as the active material causing cell reaction regardless of the type of the battery in which they are to be used and regardless of whether the cathode or the anode in which they are to be used. In the case of a nickel-hydrogen secondary battery, for example, a plate-shaped cathode active material can be prepared by pressurized forming after mixing of nickel hydroxide powder, EVA resin and the electrically conductive filler. Similarly, a plate-shaped anode active material for use in such a nickel-hydrogen secondary battery can be prepared by pressurized forming after mixing of powder of hydrogen-occluding alloy, EVA resin and the electrically conductive filler.

For example, a high-power cathode active material (power-ensuring active material) 10 can be obtained by mixing 300 g of nickel hydroxide powder, 200 g of EVA resin and 300 g of the electrically conductive filler (comprising carbon black and carbon fiber) and then pressurized forming the resultant mixture at 0.1 MPa. On the other hand, a low-power cathode active material (energy-ensuring active material) 12 can be obtained by mixing 3000 g of nickel hydroxide powder, 200 g of EVA resin and 300 g of the electrically conductive filler (comprising carbon black and carbon fiber) and then pressurized forming the resultant mixture at 0.1 MPa.

A high-power anode active material (power-ensuring active material) 14 can be obtained by mixing 600 g of hydrogen-occluding alloy powder, 200 g of EVA resin and 300 g of the electrically conductive filler (comprising carbon black and carbon fiber) and then pressurized forming the resultant mixture at 0.1 MPa. On the other hand, a low-power anode active material (energy-ensuring active material) 16 can be obtained by mixing 6000 g of hydrogen-occluding alloy powder, 200 g of EVA resin and 300 g of the electrically conductive filler (comprising carbon black and carbon fiber) and then pressurized forming the resultant mixture at 0.1 MPa.

The charge and discharge characteristics of each active material to be used can be adjusted by varying the amount of the resin or the electrically conductive filler, the pressure in pressurized forming, or the like.

A separator 18 comprising an ion-permeable substance which can be electrically insulated without any change of properties such as corrosion in an alkaline electrolyte is formed a bellows configuration. Cathode active materials 10 and 12 are incorporated into the bellows configuration on the side keeping contact with a cathode current collector 20 when loaded into a battery cell, while anode active materials 14 and 16 are incorporated into the bellows configuration on the side keeping contact with an anode current collector 22 when loaded into the battery cell, the separator 18 being located between the cathode active materials 10, 12 and the anode active materials 14, 16. In this case, each of the cathode active materials 10 and 12 and each of the anode active materials 14 and 16 preferably have their respective surfaces coated with ion-permeable current collector 24. For example, in the case of a plate-shaped cathode active material and a plate-shaped anode active material, any one of six sides can be coated with the ion-permeable current collector. In the above-described forming process, it is possible to form each active material integrated with the ion-permeable current collector to be coated. In the case where each active material is used in the shape of powder or paste, it is sufficient for the ion-permeable current collector formed into a pouch shape or the like to be filled with the active material. The ion-permeable current collector, which has voids therein for allowing ions to pass therethrough and is electrically conductive, can be used for a battery of the present invention. Examples of usable ion-permeable current collectors are metals such as foamed nickel sheet, reticulated nickel metal, nickel-plated punched metal, and nickel-plated expanded metal, foamed resins such as nickel-plated urethane; porous materials such as nickel-plated polyethylene, nickel-plated polypropylene, nickel-plated nylon, nickel-plated cotton, nickel-plated carbon fiber and the like, nickel-plated inorganic fibers of silica, alumina and the like, nickel-plated organic fibers, nickel-plated felts, and nickel-plated inorganic foils of mica and the like.

The high-power cathode active material (power-ensuring active material) 10 and the low-power cathode active material (energy-ensuring active material) 12, as well as the high-power anode active material (power-ensuring active material) 14 and the low-power anode active material (energy-ensuring active material) 16, can be incorporated into each cell in their respective desired forms and proportions. As an example, these active materials in their respective forms as illustrated in FIG. 1 or 2 can be incorporated into the cell. It is to be noted that the active materials having different charge and discharge characteristics can be incorporated into only one of the cathode or the anode. The basic unit thus obtained is loaded between the cathode current collector 20 and the anode current collector 22 together with an electrolyte (KOH, NaOH, LiOH or the like) to form a battery.

Usable as the separator 18 are a woven or nonwoven fabric which are formed from polytetrafluoroethylene, polyethylene, polypropylene, nylon or the like, or a membrane filter and the like.

Usable as each of the cathode current collector 20 and the anode current collector 22 are a nickel metal plate, nickel metal foil, carbon, nickel-plated iron or nickel-plated stainless steel, nickel-plated carbon, and the like.

The bellows-shaped unit as the basic unit is not limited to the arrangement comprising two pairs of cathode active material and anode active material. The number of pairs of active materials can be selected appropriately from a single pair, which is a minimum unit, to a desired number of pairs in forming the bellows-shaped unit. Also, plural basic units may be incorporated in parallel or stacked in series to enlarge the scale of the battery.

Next, charge and discharge of the battery according to this embodiment will be described in detail.

Charge

Voltage is applied to the battery to supply electrons from generating means (not shown) to the anode current collector 22. The electrons thus supplied travel from the anode current collector 22 to the anode active materials 14 and 16 and react with the active materials. Ions generated by the reaction pass through the separator 18 and then react with the cathode active materials 10 and 12 to release electrons. The electrons thus released travel to the cathode current collector 20 and then are fed to the generating means.

Discharge

Electrons are supplied from a load to the cathode current collector 20. The electrons thus supplied travel from the cathode current collector 20 to the cathode active materials 11 and 12 and react with the active materials. Ions generated by the reaction pass through the separator 18 and then react with the anode active materials 14 and 16 to release electrons. The electrons thus released travel to the anode current collector 22 and then are fed to the load.

For example, in FIG. 1, the high-power cathode active material 10 and the high-power anode active material 14, which are prepared according to the above-described methods, are power-ensuring active materials having energy of amount of 50 Ah and capable of discharging at 250 A for one minute, whereas the low-power cathode active material 12 and the low-power anode active material 16 are energy-ensuring active materials having energy of amount of 50 Ah and capable of discharging at 10 A for five hours. These active materials are used in a same battery. Though the total amount of energy of this battery is 100 Ah, the battery is capable of discharging at 250 A for initial one minute and then at 10 A for subsequent five hours. That is, this battery is capable of discharging at a high discharge rate instantaneously while having a high energy capacity. In addition, the battery is capable of discharging at 250 A again several tens of minutes after discharging at 250 A for one minute. Though the discharge of the power-ensuring active materials terminate immediately after instantaneous outputting of power, the energy-ensuring active materials have discharged little and hence still retain enough energy. Accordingly, the power-ensuring active materials can be charged from the energy-ensuring active materials. For this reason, the battery can repeat instantaneous outputting of power at specified time intervals. Since the charge and discharge characteristics and the amount of each of the active materials to be used can be selected according to a requirement, the performance of the battery can be adjusted in accordance with applications of the battery.

Figure 3:
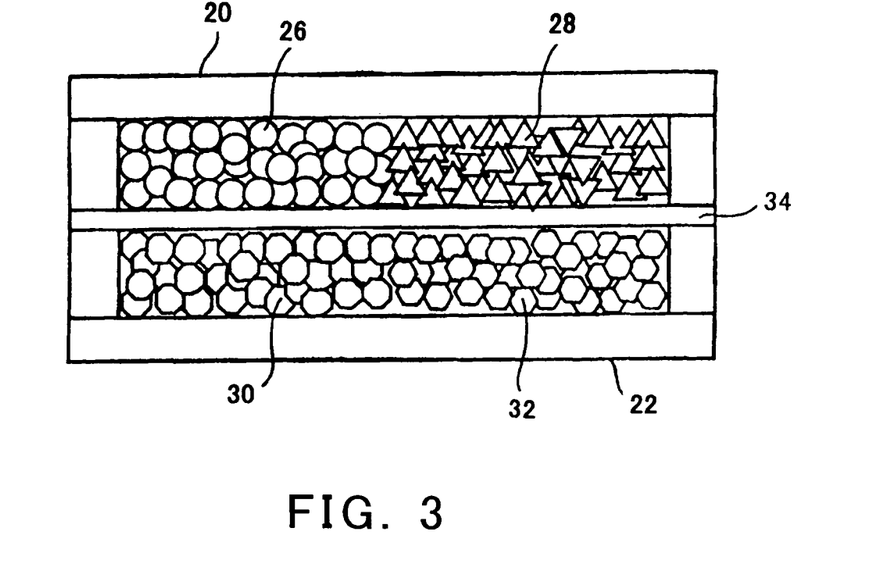
FIG. 3 is a schematic view illustrating an example of a hybrid battery (having particulate active materials) according to a second embodiment of the present invention.
Figure 4:
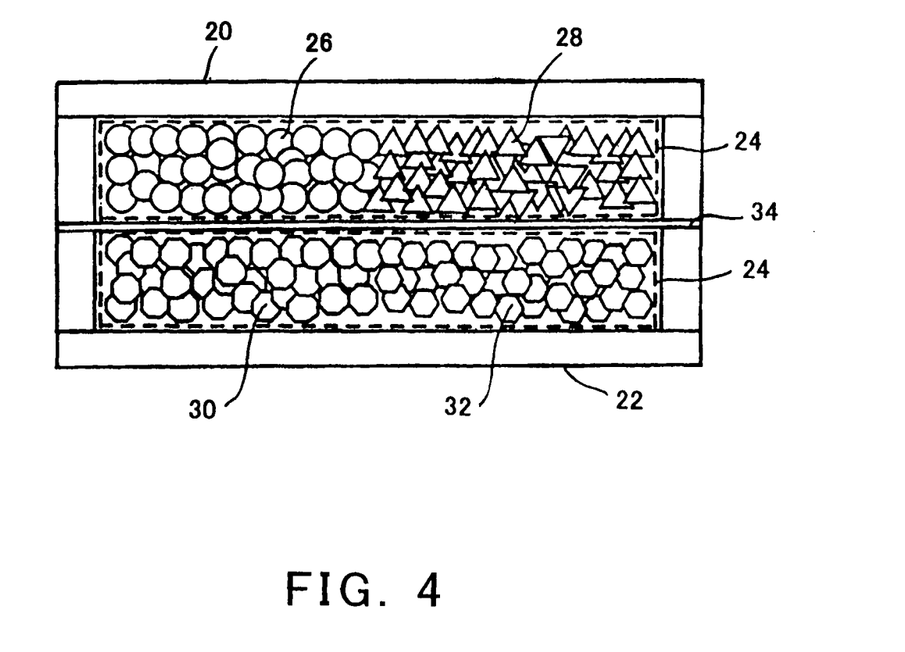
FIG. 4 is a schematic view illustrating another example of the hybrid battery (having particulate active materials) according to the second embodiment of the present invention.

FIGS. 3 and 4 illustrate hybrid batteries according to the second embodiment of the present invention. A resin and an electrically conductive filler are added to active material causing a cell reaction and the resultant mixture is cured to form a particulate active material forming product. In this case, it is possible to use a postformed product of a particulate active material. All active materials can be used as the active material causing cell reaction regardless of the type of the battery in which they are to be used and regardless of whether the cathode or the anode in which they are to be used. For example, in the case of a nickel-hydrogen secondary battery, a particulate cathode active material can be prepared by mixing and granulation, or pressurized forming or the like after mixing of nickel hydroxide powder, EVA resin and the electrically conductive filler. Similarly, a particulate anode active material for use in such a nickel-hydrogen secondary battery can be prepared by mixing and granulation, or pressurized forming or the like after mixing of powder of a hydrogen-occluding alloy, EVA resin and the electrically conductive filler.

An example of a process for preparing a high-power cathode active material (power-ensuring active material) 26 is as follows.

300 g of nickel hydroxide powder, a solution of 200 g of EVA resin dissolved in 1000 g of xylene heated to 60° C. and 300 g of the electrically conductive filler (comprising carbon black and carbon fiber) are mixed and stirred and then the resultant mixture is cooled together with an operation of stirring and pulverized into powder. The resultant powder is put into a high-speed mixer and then wholly agitated with an agitator while adjusting the size of particle with a chopper. The temperature of the particle is raised to 50° C. continuing agitation. After formation of particle, the particle is cooled and agitation is stopped. The particle is dried at room temperature under normal pressure to remove xylene. The particle thus obtained is sieved with a 2.88 mm-mesh sieve and a 1 mm-mesh sieve, and particles having a size ranging from 1 to 2.88 mm are used as the high-power cathode active material 26.

A low-power cathode active material (energy-ensuring active material) 28 can be prepared in the same manner as described above except that the amount of nickel hydroxide powder used is 3000 g.

Similarly, an example of a process for preparing a high-power anode active material (power-ensuring active material) 30 is as follows.

600 g of hydrogen-occluding alloy powder, a solution of 200 g of EVA resin dissolved in 1000 g of xylene heated to 60° C. and 300 g of the electrically conductive filler (comprising carbon black and carbon fiber) are mixed and stirred and then the resultant mixture is cooled together with an operation of stirring and pulverized into powder. The resultant powder is put into a high-speed mixer and then wholly agitated with an agitator while adjusting the size of particle with a chopper. The temperature of the particle is raised to 50° C. continuing agitation. After formation of particle, the particle is cooled and agitation is stopped. The particle is dried at room temperature under normal pressure to remove xylene. The particle thus obtained is sieved with a 2.88 mm-mesh sieve and a 1 mm-mesh sieve, and particles having a grain size ranging from 1 to 2.88 mm are used as the high-power anode active material 30.

A low-power anode active material (energy-ensuring active material) 32 can be prepared in the same manner as described above except that the amount of hydrogen-occluding alloy powder used is 6000 g.

The charge and discharge characteristics of each active material can be adjusted by varying the amount of the resin or the electrically conductive filler to be used, the size of the particle to be prepared by granulation, or the like.

A cathode cell and an anode cell are formed on opposite sides of an intervening separator 34 comprising an ion-permeable substance which is can be electrically insulated without any change of properties such as corrosion in an alkaline electrolyte. The cathode cell is loaded with the cathode active materials 26 and 28 together with an electrolyte solution, while the anode cell loaded with the anode active materials 30 and 32 together with the electrolyte solution. The cathode cell is provided with cathode current collector 20 keeping contact with the cathode active materials 26 and 28, while the anode cell provided with anode current collector 22 keeping contact with the anode active materials 30 and 32. Each of the cathode current collector 20 and the anode current collector 22 comprises a substance which is not subject to any change of properties such as corrosion in an alkaline electrolyte and which is ion-impermeable and electrically conductive. The current collectors allow electron to be taken out therethrough. It is possible to coat each of the cathode active material and the anode active material in the respective cells with ion-permeable current collector 24, as shown in FIG. 4.

The high-power cathode active material (power-ensuring active material) 26 and the low-power cathode active material (energy-ensuring active material) 28, as well as the high-power anode active material (power-ensuring active material) 30 and the low-power anode active material (energy-ensuring active material) 32, can be incorporated into each cell in their respective desired shapes and desired proportions unless they are mixed uniformly. As an example, the active materials in their respective forms as shown in FIG. 3 can be incorporated in the cells. Though the high-power cathode active material 26, low-power cathode active material 28, high-power anode active material 30 and low-power anode active material 32 are shown to have a circular shape, a triangular shape, an octagonal shape, and a hexagonal shape, respectively, in FIGS. 3 and 4, these shapes are schematically illustrated for distinction from one active material from another and, actually, all the active materials are particulate active materials having substantially the same shape. It is to be noted that active materials having different charge and discharge characteristics can be incorporated into only one of the cathode or the anode.

For example, in the arrangement shown in FIG. 3, the high-power cathode active material 26 and the high-power anode active material 30, which are prepared according to the above-described methods, are power-ensuring active materials having energy of amount of 50 Ah and capable of discharging at 250 A for one minute, whereas the low-power cathode active material 28 and the low-power anode active material 32 are energy-ensuring active materials having energy of amount of 50 Ah and capable of discharging at 10 A for five hours. These active materials are used in a same battery. Though the total amount of energy of this battery is 100 Ah, the battery is capable of discharging at 250 A for initial one minute and then at 10 A for subsequent five hours. In addition, the battery is capable of discharging at 250 A again several tens of minutes after discharging at 250 A for one minute.

Other features and operations of the batteries are the same as in the first embodiment.

Figure 5:
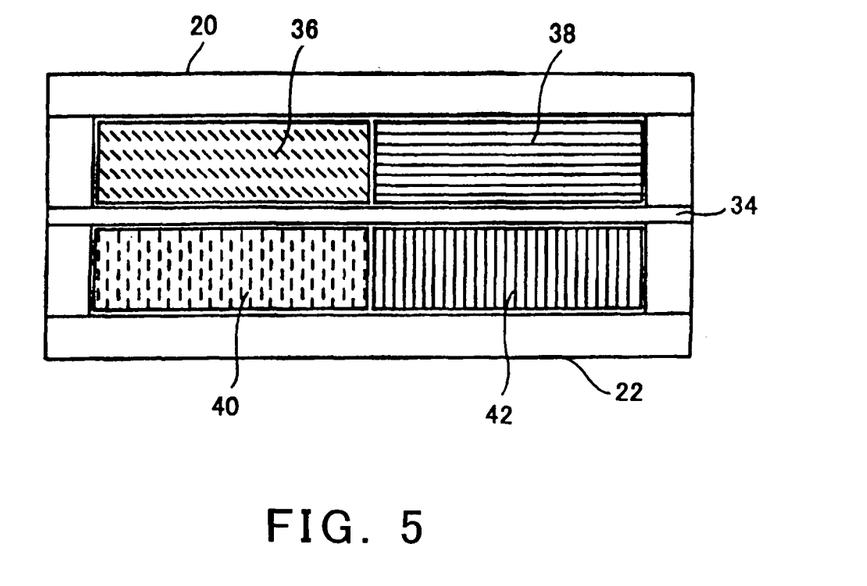
FIG. 5 is a schematic view illustrating an example of a hybrid battery (having plate-shaped active materials) according to a third embodiment of the present invention.
Figure 6:
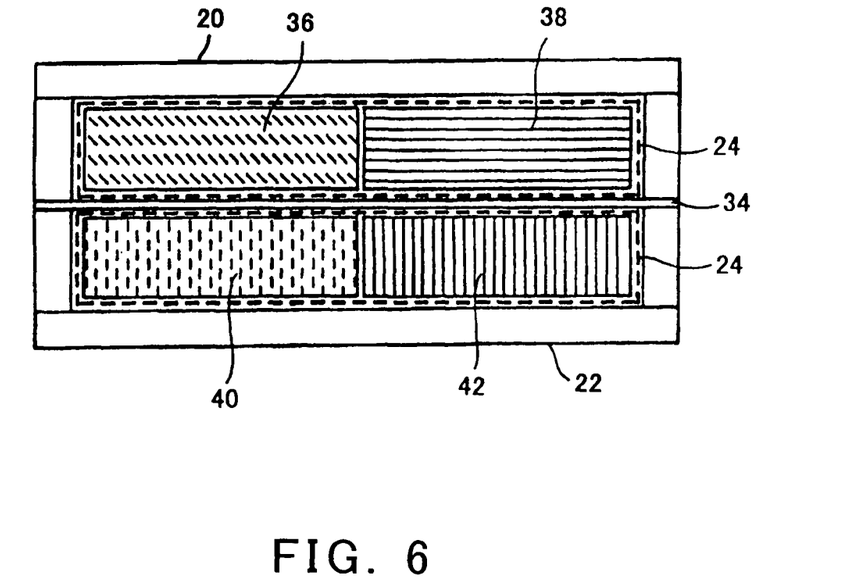
FIG. 6 is a schematic view illustrating another example of the hybrid battery (having plate-shaped active materials) according to the third embodiment of the present invention.
Figure 7:
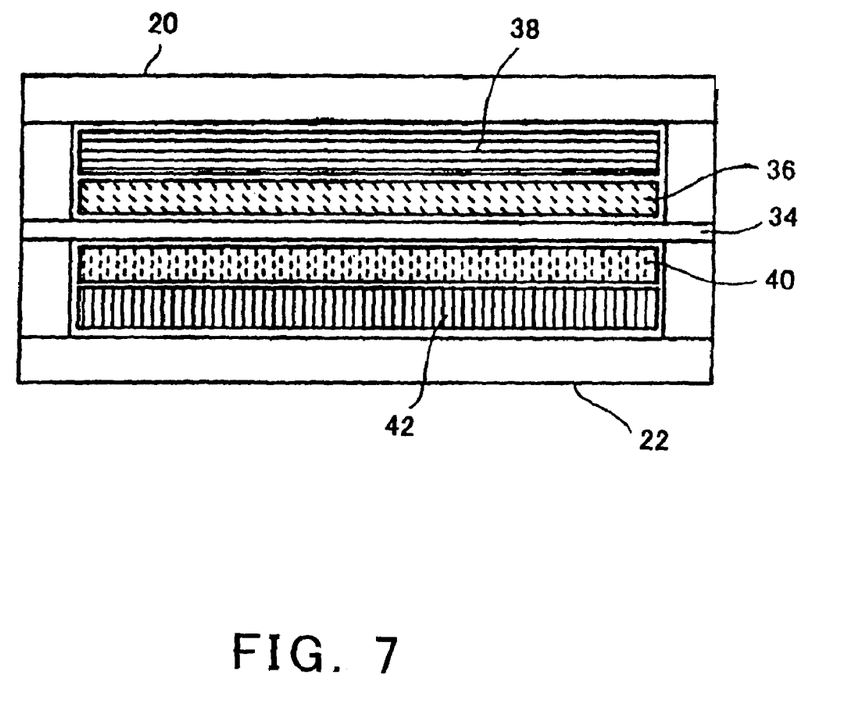
FIG. 7 is a schematic view illustrating yet another example of the hybrid battery (having plate-shaped active materials) according to the third embodiment of the present invention.

FIGS. 5, 6 and 7 illustrate hybrid batteries according to the third embodiment of the present invention. A resin and an electrically conductive filler are added to active material causing a cell reaction and the resultant mixture is cured to form an active material forming product in the shape of a plate, block, rod or the like. In this case, it is possible to use a postformed product of the active material having been formed into particle. All active materials are usable as the active material causing cell reaction regardless of the type of the battery in which they are to be used and regardless of whether the cathode or the anode in which they are to be used. For example, in the case of a nickel-hydrogen secondary battery, a cathode active material in the shape of block or plate can be prepared by pressurized forming after mixing of nickel hydroxide powder, EVA resin and the electrically conductive filler. Similarly, an anode active material in the shape of block or plate for use in such a nickel-hydrogen secondary battery can be prepared by pressurized forming after mixing of powder of hydrogen-occluding alloy, EVA resin and the electrically conductive filler.

For example, a high-power cathode active material (power-ensuring active material) 36 can be obtained by mixing 300 g of nickel hydroxide powder, 200 g of EVA resin and 300 g of the electrically conductive filler (comprising carbon black and carbon fiber) and then pressurized forming the resultant mixture at 0.1 MPa. On the other hand, a low-power cathode active material (energy-ensuring active material) 38 can be obtained by mixing 3000 g of nickel hydroxide powder, 200 g of EVA resin and 300 g of the electrically conductive filler (comprising carbon black and carbon fiber) and then pressurized forming the resultant mixture at 0.1 MPa.

A high-power anode active material (power-ensuring active material) 40 can be obtained by mixing 600 g of hydrogen-occluding alloy powder, 200 g of EVA resin and 300 g of the electrically conductive filler (comprising carbon black and carbon fiber) and then pressurized forming the resultant mixture at 0.1 MPa. On the other hand, a low-power anode active material (energy-ensuring active material) 42 can be obtained by mixing 6000 g of hydrogen-occluding alloy powder, 200 g of EVA resin and 300 g of the electrically conductive filler (comprising carbon black and carbon fiber) and then pressurized forming the resultant mixture at 0.1 MPa.

The charge and discharge characteristics of each active material to be used can be adjusted by varying the amount of the resin or the electrically conductive filler to be used, the pressure in pressurized forming or the like.

A cathode cell and an anode cell are formed on opposite sides of intervening separator 34 comprising an ion-permeable substance which can be electrically insulated without any change of properties such as corrosion in an alkaline electrolyte. The cathode cell is loaded with the cathode active materials 36 and 38 together with an electrolyte solution, while the anode cell loaded with the anode active materials 40 and 42 together with the electrolyte solution. The cathode cell is provided with the cathode current collector 20 keeping contact with the cathode active materials 36 and 38, while the anode cell provided with the anode current collector 22 keeping contact with the anode active materials 40 and 42. Each of the cathode current collector 20 and the anode current collector 22 comprises a substance which is not subject to any change of properties such as corrosion in an alkaline electrolyte and which is ion-impermeable and electrically conductive. The current collectors allow electron to be taken out therethrough. It is possible to coat each of the cathode active material and the anode active material with ion-permeable current collector 24, as shown in FIG. 6.

The high-power cathode active material (power-ensuring active material) 36 and the low-power cathode active material (energy-ensuring active material) 38, as well as the high-power anode active material (power-ensuring active material) 40 and the low-power anode active material (energy-ensuring active material) 32, can be incorporated into each cell in their respective desired shapes and desired proportions. As an example, the active materials in their respective forms as shown in FIGS. 5 and 7 can be incorporated into the cells. It is to be noted that active materials having different charge and discharge characteristics can be incorporated into only one of the cathode or the anode.

In FIG. 5 for example, the high-power cathode active material 36 and the high-power anode active material 40, which are prepared according to the above-described methods, are power-ensuring active materials having energy of amount of 50 Ah and capable of discharging at 250 A for one minute, whereas the low-power cathode active material 38 and the low-power anode active material 42 are energy-ensuring active materials having energy of amount of 50 Ah and capable of discharging at 10 A for five hours. These active materials are used in a same battery. Though the total amount of energy of this battery is 100 Ah, the battery is capable of discharging at 250 A for initial one minute and then at 10 A for subsequent five hours. In addition, the battery is capable of discharging at 250 A again several tens of minutes after discharging at 250 A for one minute.

Other features and operations of the batteries are the same as in the first and second embodiments.

INDUSTRIAL APPLICABILITY

Since the present invention is composed as described above, it is suitably applicable to a hybrid battery which is capable of instantaneously outputting high power in a starting operation or the like and having an increased energy capacity.

10, 26, 36 . . . high-power cathode active material (power-ensuring active material), 12, 28, 38 . . . low-power cathode active material (energy-ensuring active material), 14, 30, 40 . . . high-power anode active material (power-ensuring active material), 16, 32, 42 . . . low-power anode active material (energy-ensuring active material), 18, 34 . . . separator, 20 . . . cathode current collector, 22 . . . anode current collector, 24 . . . ion-permeable current collector

The invention claimed is:

1. A hybrid battery comprising two cells connected with a separator interposed therebetween, a forming product of a cathode active material disposed in an electrolyte in one of the cells, a forming product of an anode active material disposed in an electrolyte in the other cell, a cathode current collector maintaining contact with the forming product of the cathode active material, and an anode current collector maintaining contact with the forming product of the anode active material, wherein the forming product of the cathode active material and the forming product of the anode active material each comprises a combination of a forming product of a power-ensuring active material comprising an electrically conductive filler and a single cell reaction causing material for providing a battery which is chargeable and dischargeable at a large current and has a low storage capacity, the power-ensuring active material having a ratio R1 of an amount of electrically conductive filler to an amount of single cell reaction causing material, and a separate forming product of energy-ensuring active material comprising an electrically conductive filler and a single cell reaction causing material for providing a battery which is chargeable and dischargeable at a small current and has a high storage capacity, the energy ensuring material having a ratio R2 of an amount of electrically conductive filler to an amount of single cell reaction causing material, each combination being disposed in a single cell, R1 being greater than R2, such that the amount of conductive filler relative to the amount of single cell reaction causing material is greater in the power-ensuring active material than the energy-ensuring active material, and respective surfaces of the forming products of the cathode and anode active materials being coated with an ion-permeable current collector which has voids therein for allowing ions to pass therethrough, such that the ion-permeable current collector surrounds the forming products the cathode and anode active materials and the surface is electrically conductive.

2. The hybrid battery according to claim 1, wherein the forming product of the power-ensuring active material and the forming product of the energy ensuring active material have at least one shape selected from the group consisting of a particle, a plate, a block, a rod, and a shape resulting from postforming of particles.

3. The hybrid battery according to claim 1, wherein the ion-permeable current collector comprises at least one material selected from the group consisting of foamed nickel metal, reticulated nickel metal, nickel-plated punched metal, nickel-plated expanded metal, nickel-plated urethane, nickel-plated polyethylene, nickel-plated polypropylene, nickel-plated nylon, nickel-plated cotton, nickel-plated carbon fiber, nickel-plated inorganic fibers of silica, nickel-plated inorganic fibers of alumina, nickel-plated organic fibers, nickel-plated felts, nickel-plated inorganic foils of mica, and combinations thereof.

4. The hybrid battery according to claim 1, wherein the separator can be electrically insulated without any change of properties in an alkaline electrolyte and allows ions to pass therethrough, and comprises a woven or nonwoven fabric, which is formed from at least one of polytetrafluoroethylene, polyethylene, polypropylene, nylon, or a membrane filter.

5. The hybrid battery according to claim 1, wherein each of the cathode current collector and the anode current collector is not subject to any change of properties in an alkaline electrolyte and is ion-impermeable and electrically conductive, and comprises at least one selected from the group consisting of nickel metal plate, nickel metal foil, carbon, nickel-plated iron, nickel-plated stainless steel, and nickel-plated carbon.

6. The hybrid battery according to claim 1, wherein the forming product of the power-ensuring active material and the forming product of the energy-ensuring active material are produced by adding an electrically conductive filler and a resin to material causing a cell reaction and then curing the resultant mixture.

7. The hybrid battery according to claim 6, wherein the forming product of the power-ensuring active material and the forming product of the energy-ensuring active material are obtained by performing one or more of increasing or decreasing the amounts of one of the electrically conductive filler and the resin, enlarging or reducing the size of each of the forming products, and increasing or decreasing the density of each of the forming products.

* * * * *